United States Patent
Chang

(10) Patent No.: US 8,201,002 B2
(45) Date of Patent: Jun. 12, 2012

(54) CONTROL SYSTEM AND CONTROL METHOD FOR SAVING POWER BY ACTIVATING POWER SUPPLIES WITH SHORTEST RECORDED POWER SUPPLY TIMES

(75) Inventor: Li-Wen Chang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 269 days.

(21) Appl. No.: 12/551,466

(22) Filed: Aug. 31, 2009

(65) Prior Publication Data

US 2011/0040993 A1    Feb. 17, 2011

(30) Foreign Application Priority Data

Aug. 12, 2009 (CN) .......................... 2009 1 0305531

(51) Int. Cl.
| | |
|---|---|
| G06F 1/00 | (2006.01) |
| G06F 1/26 | (2006.01) |
| G06F 1/32 | (2006.01) |
| G06F 11/30 | (2006.01) |
| G05F 3/02 | (2006.01) |
| H02J 1/00 | (2006.01) |
| F02P 3/02 | (2006.01) |

(52) U.S. Cl. ........ 713/320; 713/300; 713/324; 713/340; 323/304; 323/318; 323/371

(58) Field of Classification Search .................. 323/304, 323/318, 371

See application file for complete search history.

(56) References Cited

U.S. PATENT DOCUMENTS

| | | | | |
|---|---|---|---|---|
| 7,126,608 | B2* | 10/2006 | Alben et al. ................... | 345/501 |
| 2003/0004659 | A1* | 1/2003 | Hayashi et al. ................. | 702/60 |
| 2009/0132835 | A1* | 5/2009 | Ehmann ......................... | 713/300 |
| 2009/0307514 | A1* | 12/2009 | Roberts et al. ................ | 713/330 |
| 2010/0097044 | A1* | 4/2010 | Gipson ......................... | 323/285 |
| 2011/0025129 | A1* | 2/2011 | Humphrey et al. ............. | 307/64 |
| 2011/0029788 | A1* | 2/2011 | Domingo et al. ............. | 713/300 |

* cited by examiner

*Primary Examiner* — Ji H Bae
(74) *Attorney, Agent, or Firm* — Altis Law Group, Inc.

(57) ABSTRACT

A control system for saving power in an electronic device obtains information of maximum power that can be supplied to the electronic device by each power supply, detects how much power is demanded by the electronic device, determines minimum number of the plurality of power supplies, based on the detected power demanded by the electronic device, and turns on power supplies, of which the number is equal to the determined minimum number, and turn off the other power supplies.

4 Claims, 3 Drawing Sheets

CONTROL SYSTEM AND CONTROL METHOD FOR SAVING POWER BY ACTIVATING POWER SUPPLIES WITH SHORTEST RECORDED POWER SUPPLY TIMES

BACKGROUND

1. Technical Field

The present disclosure relates to control systems and control methods, and particularly to a control system and a control method for saving power.

2. Description of Related Art

At present, several power supplies are used to supply power to a server at the same time. Power demanded by a server varies and even when the power demanded is minimal, all the power supplies remain on, which wastes energy.

DETAILED DESCRIPTION

Figure 1:
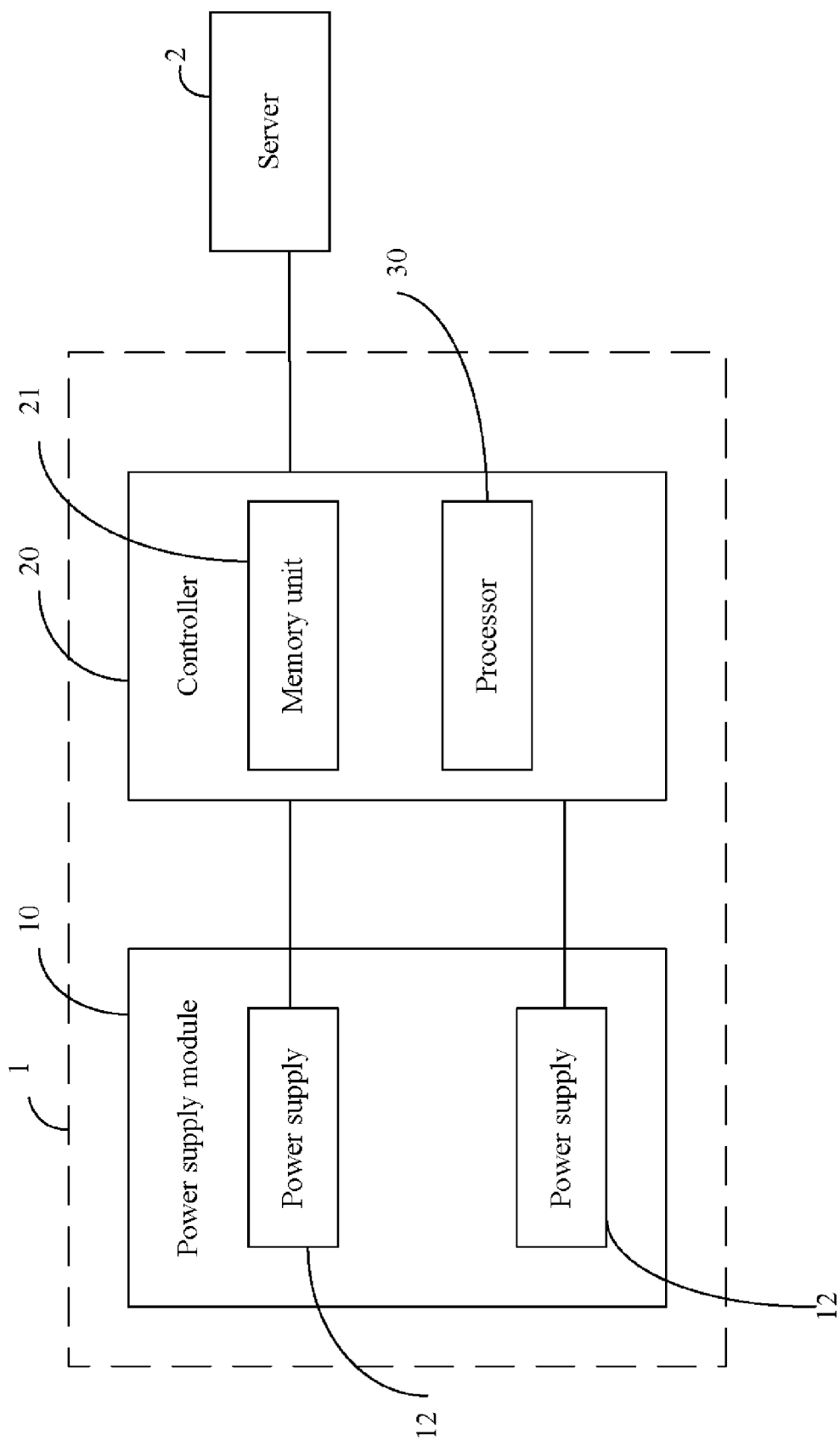
FIG. 1 is a block diagram of one embodiment of a control system for saving power, the control system including a memory unit.

Referring to FIG. 1, an exemplary embodiment of a control system 1 used to save power in an electronic device, such as a server 2, is shown. The control system 1 includes a power supply module 10 for supplying power to the server 2, and a controller 20 connected between the power supply module 10 and the server 2. The power supply module 10 includes a plurality of power supplies 12. The controller 20 includes a memory unit 21 and a processor 30 connected to the memory unit 21. The control system 1 selectively turns on or off the power supplies 12 to maintain the minimum number of the power supplies 12 demanded to supply power according to current demand of the server 2, which minimizes waste.

The memory unit 21 may be a random access memory (RAM) for temporary storage of information and/or a read only memory (ROM) for permanent storage of information.

Figure 2:
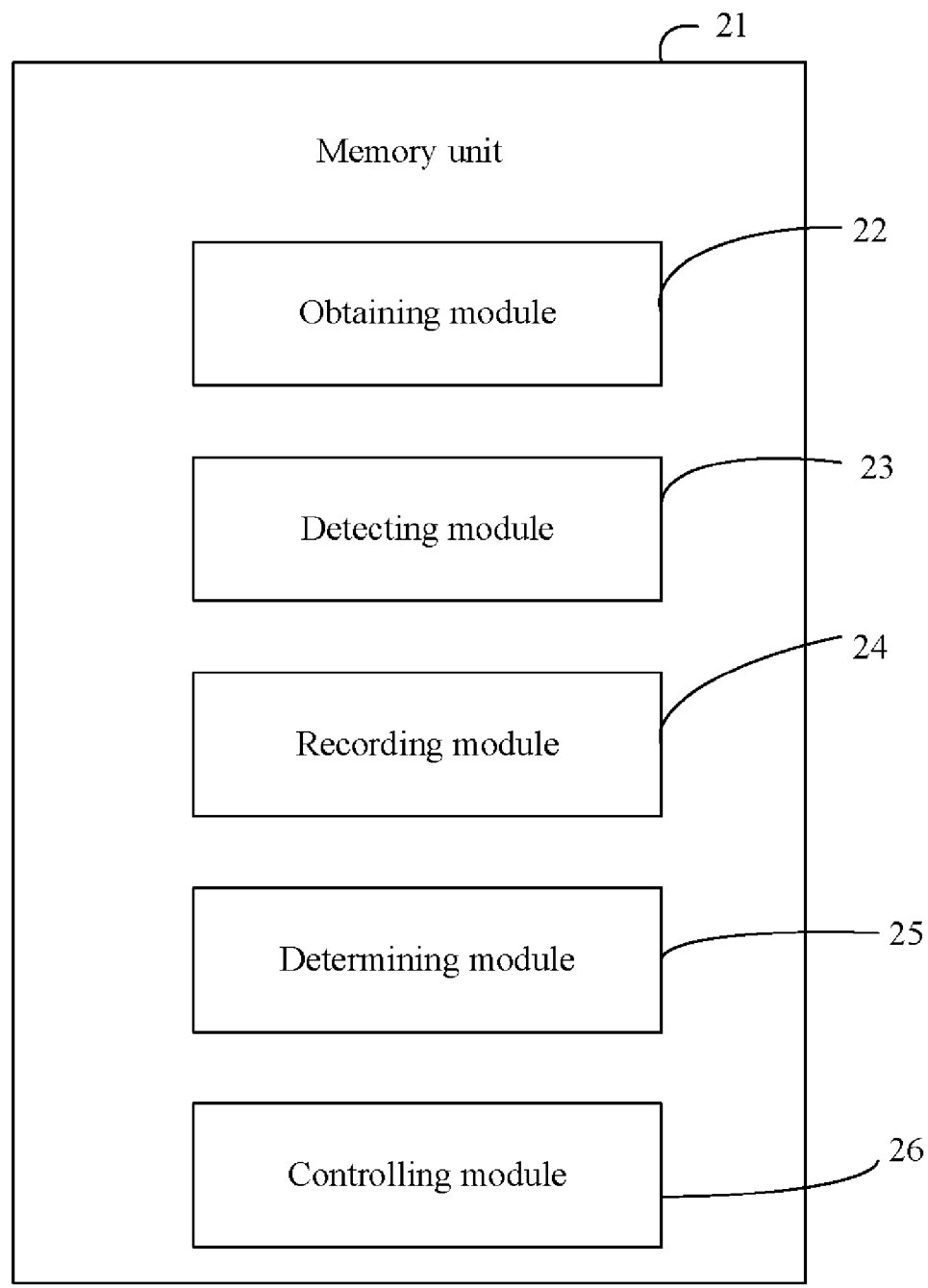
FIG. 2 is a block diagram of one embodiment of the memory unit of FIG. 1.

Referring to FIG. 2, the memory unit 21 includes an obtaining module 22, a detecting module 23, a recording module 24, a determining module 25, and a control module 26. The obtaining module 22, the detecting module 23, the recording module 24, the determining module 25, and the control module 26 may include one or more computerized instructions executable by the processor 30.

The obtaining module 22 is operable to obtain information of maximum power that can be supplied to the server 2 by each power supply 12.

The detecting module 23 is operable to detect how much power is demanded by the server 2, and output the detected power demanded by the server 2 to the determining module 25.

The determining module 25 is operable to determine the minimum number of the power supplies 12 demanded at any given time, based on the detected power demanded by the server 2, and output the determined minimum number of power supplies 12 to the control module 26.

The recording module 24 is operable to accumulate and record power supply time for each power supply 12.

The control module 26 is operable to turn on the power supplies 12, of which the number is equal to the determined minimum number and further to select which of the power supplies 12 should be turned on when less than all of them are demanded according to the recorded power supply times. The power supplies 12 chosen to be turned on are those whose recorded power supply times are the shortest among all power supplies 12, to prolong the life of the power supplies 12.

The determining module 25 is operable to determine if the power demand of the server 2 has changed. If the power demand has not changed, the detecting module 23 goes on to detect the power needed by the server 2. If the power demand has changed, the determining module 25 redetermines the minimum number of the power supplies 12 demanded to meet the new power demand, and output the redetermined minimum number to the control module 26.

Figure 3:
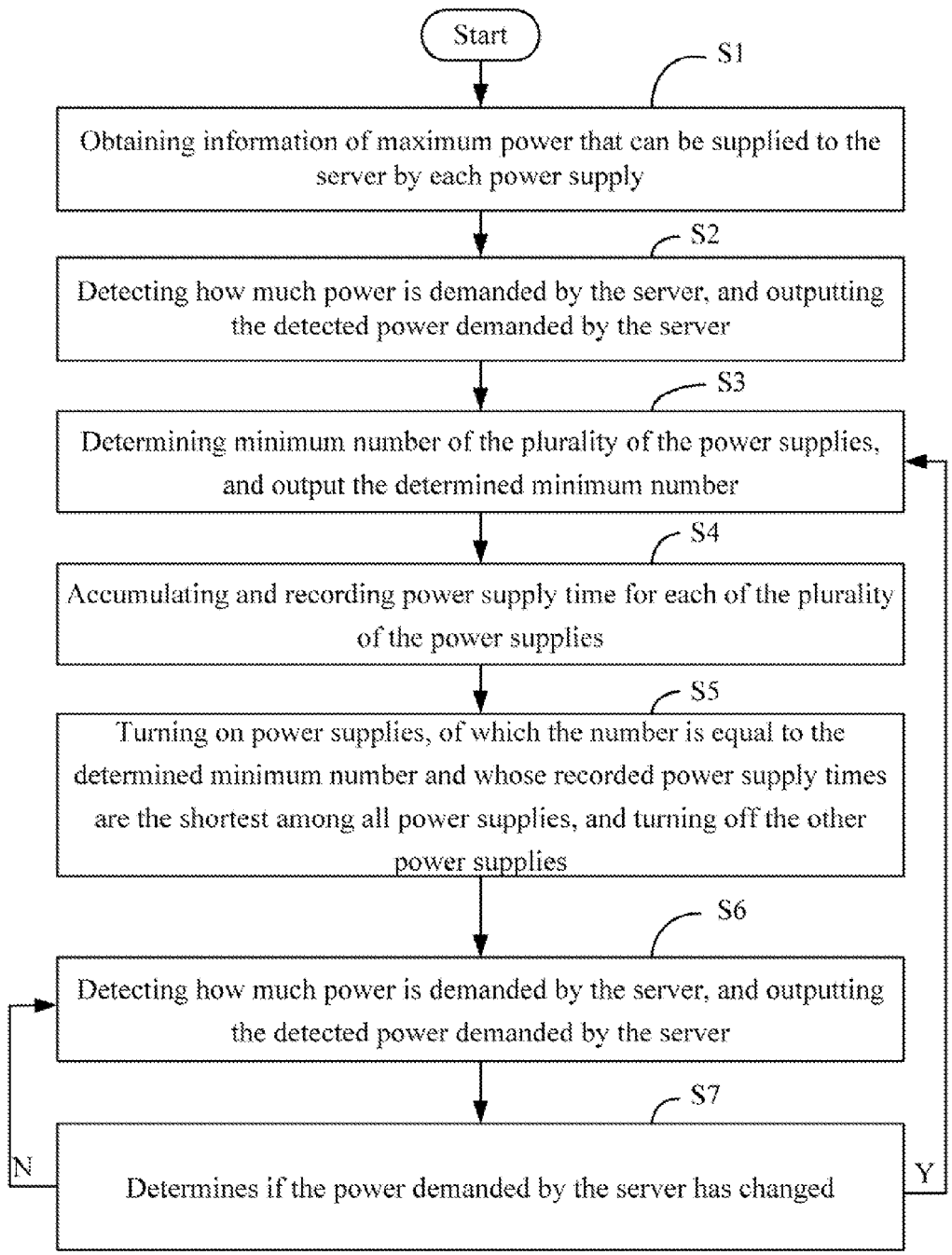
FIG. 3 is a flowchart illustrating one embodiment of a control method for saving power.

Referring to FIG. 3, an exemplary embodiment of control method is used to save power for the server 2. Each power supply 12 is turned on to supply power to the server 2 before the server 2 is powered on. The recording module 24 records the power supply time of each power supply 12 as zero at an initial state. The control method includes the following steps.

In step S1, the obtaining module 22 obtains information of maximum power that can be supplied to the server 2 by each power supply 12.

In step S2, the detecting module 23 detects how much power is demanded by the server 2, and outputs the detected power demanded by the server 2 to the determining module 25.

In step S3, the determining module 25 determines the minimum number of the plurality of the power supplies 12, based on the detected power demanded by the server 2, and outputs the determined minimum number to the control module 26.

In step S4, the recording module 24 accumulates and records power supply time for each of the plurality of the power supplies 12.

In step S5, the control module 16 turns on the power supplies 12, of which the number is equal to the determined minimum number, and whose recorded power supply times are the shortest among all power supplies 12, and turns off the other power supplies 12.

In step S6, the detecting module 23 detects how much power is demanded by the server 2, and outputs the detected power needed by the server 2 to the determining module 25.

In step S7, the determining module 25 determines if power demand of the server has changed. If the power demand has not changed, the procedure goes back to the step S6. If the power demand has changed, the procedure goes back to the step S3.

For example, the power supply module 10 includes three power supplies 12. The three power supplies 12 are turned on to supply power to the server 2 before the server 2 is powered on. The obtained maximum power of each power supply 12 is 200 watts (W). The demanded power by the server 2 is 220 W. The determined minimum number of the power supplies 12 is two, base on the detected power demanded by the server 2. The recorded power supply times of the three power supply 12 are all 1 minutes. The control module 25 turns off one of the three power supplies 12 and maintains turning on the other two power supplies 12 to supply power to the server 2. The detecting module 23 detects that the power demanded by the server is 260 W. The determining module 25 determines that power demanded by the server 2 has not changed. The recording module 24 records that the power supply times of the two power supplies 12 are all 10 minutes, the power supply time of the other power supply 12 is 1 minute. The control module 25 turns on the power supply 12 whose power supply time is 1 minute, turns off one of the two power supplies 12 whose power supply time are 10 minutes, and maintains turning on the other power supply 12.

It is to be understood, however, that even though numerous characteristics and advantages of the embodiments have been set forth in the foregoing description, together with details of the structure and function of the embodiments, the disclosure is illustrative only, and changes may be made in details, especially in matters of shape, size, and arrangement of parts within the principles of the embodiments to the full extent indicated by the broad general meaning of the terms in which the appended claims are expressed.

What is claimed is:

1. A control system for saving power for an electronic device, the control system comprising:
   a plurality of power supplies for supplying power to the electronic device;
   a controller connected between the plurality of power supplies and the electronic device, the controller comprising:
      a processor; and
      a memory unit connected to the processor, and storing a plurality of modules each of which contains one or more computerized instructions to be executed by the processor, wherein the modules comprises:
         an obtaining module to obtain information of maximum power that can be supplied to the electronic device by each power supply;
         a detecting module to detect how much power is demanded by the electronic device, and output the detected power demanded by the electronic device;
         a determining module to determine the minimum number of the plurality of power supplies demanded at any given time, based on the detected power demanded by the electronic device, and output the determined minimum number of the plurality of power supplies, and determine if power demanded by the electronic device has changed; if the power demanded by the electronic device has not changed, the detecting module goes on to detect the power demanded by the electronic device; if the power needed by the electronic device has changed, the determining module determines minimum number of the power supplies and output the determined minimum number; and
         a control module to turn on the power supplies, of which the number is equal to the determined minimum number, and turn off the other power supplies,
   wherein the memory unit further comprises a recording module, the recording module is operable to accumulate and record power supply time for each of the plurality of power supplies, the control module is operable to turn on the power supplies the number of which is equal to the determined minimum number and further to select which of the power supplies should be turned on when less than all of them are demanded according to the recorded power supply times, the power supplies chosen to be turned are those whose recorded power supply times are the shortest among all power supplies, and turn off the other power supplies.

2. The control system of claim 1, wherein the electronic device is a server.

3. A control method for saving power for an electronic device, the control method comprising:
   a: obtaining information of maximum power that can be supplied to the electronic device by each of a plurality of power supplies;
   b: detecting how much power is demanded by the electronic device, and output the detected power demanded by the electronic device;
   c: determining minimum number of the plurality of power supplies, based on the detected power demanded by the electronic device, and output the determined minimum number of power supplies;
   c1: accumulating and recording power supply time for each of the plurality of the power supplies;
   d: turning on power supplies, the number of which is equal to the determined minimum number and whose recorded power supply times are the shortest among all power supplies, and turn off the other power supplies;
   e: detecting how much power is demanded by the electronic device, and output the detected power demanded by the electronic device; and
   f: determining whether the power demanded by the electronic device has changed; if the power demanded by the electronic device has not changed, the control method goes back the step e; if the power needed by the electronic device has changed, the control method goes back the step c.

4. The control method of claim 3, wherein the electronic device is a server.

* * * * *